Patented Oct. 31, 1933

1,932,577

UNITED STATES PATENT OFFICE 1,932,577

WATER-INSOLUBLE DISAZO-DYESTUFFS

Heinz Eichwede, Frankfort-on-the-Main-Hochst, and Adolph Koch, Niedernhausen in Taunus, Germany, assignors to General Aniline Works, Inc., New York, N. Y., a corporation of Delaware No Drawing. Application December 22, 1932, Serial No. 648,518, and in Germany December 24, 1931

4 Claims. (Cl. 260—78)

The present invention relates to new water-insoluble disazo-dyestuffs, more particularly it relates to dyestuffs corresponding to the following probable formula:

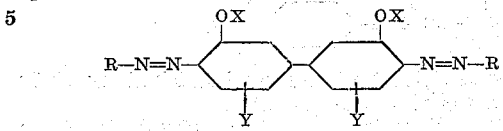

wherein X stands for methyl or ethyl, Y for chlorine, bromine or fluorine and R represents the radical of an acyl-acetic acid-arylide which must not contain sulfonic or carboxylic acid groups.

We have found that valuable dyestuffs are obtainable, by tetrazotizing a dihalogen-dialkoxy-diamino-diphenyl of the general formula:

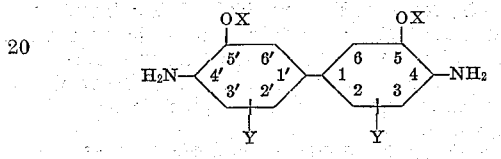

wherein X means methyl or ethyl and Y stands for chlorine, bromine or fluorine, and coupling it with an acyl-acetic acid-arylide. The dyestuffs, thus obtained, are distinguished by fastness properties which allow to use the dyestuffs on an industrial scale for the production of lakes. Since the new dyestuffs are practically insoluble in natural rubber or in synthetic products having properties similar to those of natural rubber, they do not bleed out in the production and treatment of rubber articles. Furthermore, they do not give rise to the phenomenon which is known as blushing or efflorescence when the rubber articles are stored. Moreover, they are insoluble in benzine which renders them especially suitable also for being used in connection with cold vulcanization processes which are advantageously carried out in the presence of benzine. The new dyestuffs, therefore, are particularly adapted for producing colored rubber articles.

The following examples serve to illustrate the invention, but they are not intended to limit it thereto, the parts being by weight:

1. 31.3 parts of 2.2'-dichloro-5.5'-dimethoxy-4.4'-diaminodiphenyl are tetrazotized in a hydrochloric acid solution in known manner with 13.8 parts of sodium nitrite. The tetrazo-solution obtained is run into a finely dispersed suspension of 35.5 parts of acetoacetic acid-anilide, thereupon, the free mineral acid is removed by addition of a dilute solution of sodium acetate, sodium bicarbonate or sodium carbonate. When the coupling is finished, the dyestuff which has separated is filtered with suction, washed out and dried at low temperature. The dyestuff forms a greenish-yellow, voluminous powder.

It corresponds to the following formula:

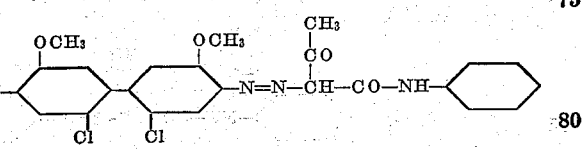

In view of its insolubility in oils, the dyestuff may be used in the manufacture of lakes for various purposes, for instance, for the production of nitrocellulose lakes, for tin printing or for graphical purposes and may also be used for producing colored rubber articles.

By using instead of acetoacetic acid-anilide another coupling component as, for instance, acetoacetic acid-o-anisidide, acetoacetic acid-o-toluidide, acetoacetic acid-o-chloranilide, acetoacetic acid-m-xylidide or the like, there are likewise obtained yellow dyestuffs of similar properties.

2. A tetrazo-solution prepared according to Example 1 is run into a finely dispersed suspension of 48 parts of benzoylacetic acid-anilide, and the coupling is finished by removing the mineral acid as described in Example 1. The dyestuff which has been filtered by suction and washed out, forms after having been dried a reddish-yellow powder of good fastness properties.

It corresponds to the following formula:

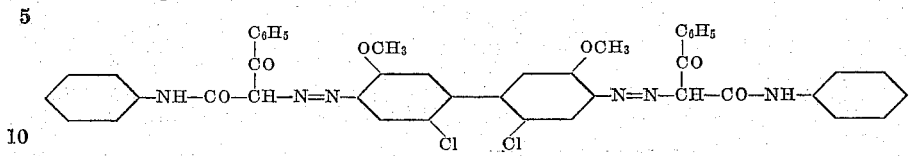

Instead of benzoylacetic acid-anilide, there may also be used its substitution products containing substituents in the phenyl radicals.

3. 31.3 parts of 6.6'-dichloro-5.5'-dimethoxy-4.4'-diaminodiphenyl are tetrazotized in a hydrochloric acid solution with 13.8 parts of sodium nitrite; the tetrazo-solution is run into 35.5 parts of acetoacetic acid-anilide, as described in Example 1. The yellow dyestuff, thus formed, is insoluble in oils and rubber articles and possesses a good fastness to vulcanization.

The dyestuff corresponds to the following formula:

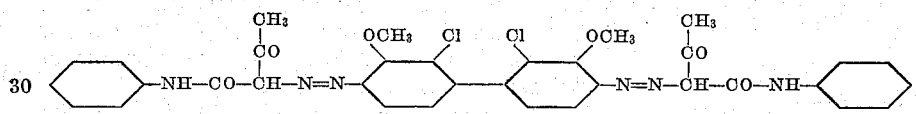

By using as tetrazo-component an equivalent amount of 6.6'-dichloro-5.5'-diethoxy-4.4'-diaminodiphenyl and combining the tetrazo-solution with an acylacetic acid-arylide mentioned in the preceding examples, there are obtained dyestuffs having similar shades and fastness properties. Instead of dichlorinated dialkoxy-diaminodiphenyls, there may be used in the same manner bases which contain 2 atoms of bromine or fluorine instead of the two chlorine atoms; also in these cases dyestuffs of valuable fastness properties are obtained.

We claim:

1. The water-insoluble disazo-dyestuffs of the following general formula:

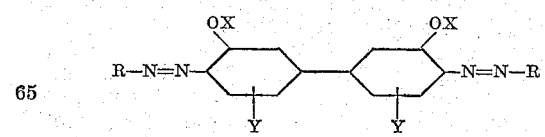

wherein X stands for methyl or ethyl, Y for chlorine, bromine or fluorine and R represents the radical of an acyl-acetic acid-arylide which must not contain sulfonic or carboxylic acid groups, being vivid yellow dyestuffs which are insoluble in oils and rubber articles and are distinguished by their good fastness to vulcanization.

2. The water-insoluble disazo-dyestuffs of the following general formula:

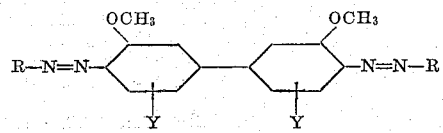

wherein Y stands for chlorine, bromine or fluorine and R represents the radical of an acetoacetic-acid-arylide which must not contain sulfonic or carboxylic acid groups, being vivid yellow dyestuffs which are insoluble in oils and rubber articles and are distinguished by their good fastness to vulcanization.

3. The water-insoluble disazo-dyestuffs of the following general formula:

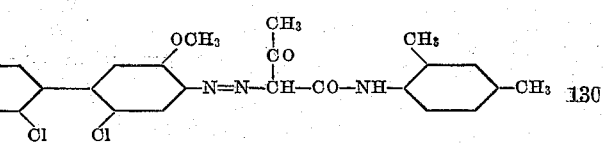

wherein R represents a radical of the benzene series which must not contain sulfonic or carboxylic acid groups, being vivid yellow dyestuffs which are insoluble in oils and rubber articles and are distinguished by their good fastness to vulcanization.

4. The water-insoluble disazo-dyestuff of the following formula:

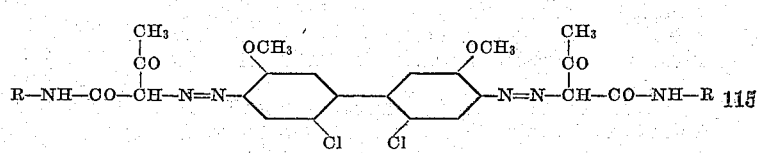

being a vivid yellow dyestuff which is insoluble in oils and rubber articles and is distinguished by its good fastness to vulcanization.

HEINZ EICHWEDE.
ADOLPH KOCH.